US011037714B2

(12) United States Patent
Frangen

(10) Patent No.: US 11,037,714 B2
(45) Date of Patent: Jun. 15, 2021

(54) MOVEMENT APPARATUS WITH DECOUPLED POSITION CONTROLLERS

(71) Applicant: Robert Bosch GmbH, Stuttgart (DE)

(72) Inventor: Joachim Frangen, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 16/407,709

(22) Filed: May 9, 2019

(65) Prior Publication Data
US 2019/0386586 A1  Dec. 19, 2019

(30) Foreign Application Priority Data

Jun. 13, 2018  (DE) ...................... 10 2018 209 402.0

(51) Int. Cl.
*H02N 15/00* (2006.01)
*H01F 7/02* (2006.01)
*G01D 5/20* (2006.01)

(52) U.S. Cl.
CPC ......... *H01F 7/0236* (2013.01); *G01D 5/2073* (2013.01); *H02N 15/00* (2013.01)

(58) Field of Classification Search
CPC .... H02N 15/00; G01D 5/2073; G01D 5/2086; Y02T 10/64; G01B 7/004; B60L 2240/32;
(Continued)

(56) References Cited

U.S. PATENT DOCUMENTS 4,874,998 A * 10/1989 Hollis, Jr. .................. B25J 9/12
318/568.21
6,259,174 B1 * 7/2001 Ono ..................... G03F 7/70758
310/13
(Continued)

FOREIGN PATENT DOCUMENTS

DE  199 60 321 A1  7/2001
DE  102016215212 A1  2/2018
(Continued)

OTHER PUBLICATIONS

German Search Report corresponding to DE 10 2018 209 402.0, dated Jan. 15, 2019 (German language document) (10 pages).
(Continued)

*Primary Examiner* — Mohamad A Musleh
(74) *Attorney, Agent, or Firm* — Maginot, Moore & Beck LLP

(57) ABSTRACT

The disclosure relates to a method for operating a movement apparatus having a first assembly and a second assembly. The first assembly includes a base and several permanent-magnet arrangements that are connected to the base via actuators such that they move as a whole relative to the base in at least one degree of freedom by the assigned actuator, the second assembly including a base and a permanent-magnet arrangement arranged firmly relative to the base. Position controllers are provided, each with a controlled variable and with a correcting variable. The controlled variable is one of six possible degrees of freedom with regard to a relative position between the first and second assembly. The correcting variable represents a force or a torque that has been assigned to the degree of freedom. Desired positions of the actuators are computed from the correcting variables and the actuators are set accordingly.

13 Claims, 5 Drawing Sheets

(58) Field of Classification Search
CPC .......... B60L 2260/48; B60L 2240/423; B60L 13/10; B60L 13/08; G05D 3/12; G05B 19/402
See application file for complete search history.

(56) References Cited

U.S. PATENT DOCUMENTS

| | | |
|---|---|---|
| 6,615,155 B2 | 9/2003 | Gilboa |
| 2006/0214756 A1* | 9/2006 | Elliott .................... H02N 15/00 335/306 |
| 2010/0109448 A1* | 5/2010 | Mamba ................ H02K 41/033 310/12.17 |
| 2014/0365690 A1 | 12/2014 | Paramasivam et al. |

FOREIGN PATENT DOCUMENTS

| | | |
|---|---|---|
| DE | 10 2016 224 951 A1 | 6/2018 |
| WO | 2015/017933 A1 | 2/2015 |

OTHER PUBLICATIONS

Wikipedia article; Euler angles, https://en.wikipedia.org/wiki/Euler_angles, 12 pages.
Wikipedia article; Magnetic moment, https://en.wikipedia.org/wiki/Magnetic_moment, 17 pages.
Wikipedia article; Control theory, https://en.wikipedia.org/wiki/Control_theory, 16 pages.
Wikipedia article; Gradient descent, https://en.wikipedia.org/wiki/Gradient_descent, 17 pages.

* cited by examiner

MOVEMENT APPARATUS WITH DECOUPLED POSITION CONTROLLERS

This application claims priority under 35 U.S.C. § 119 to application no. DE 10 2018 209 402.0, filed on Jun. 13, 2018 in Germany, the disclosure of which is incorporated herein by reference in its entirety.

BACKGROUND

From WO 2015/017933 A1 a movement apparatus is known in which the magnetic forces are generated by means of electromagnets. This gives rise to great losses of energy.

In German patent application with file reference 102016224951.7 the reference has described a completely novel movement apparatus with which it is possible to achieve the function known from WO 2015/017933 A1 solely by using permanent magnets. As a result, far less waste heat arises, and at the same time far greater loads can be held in a hovering position.

SUMMARY

The disclosure relates to a method for operating a movement apparatus, and to a movement apparatus, which has been set up in accordance with this method. With movement apparatuses of such a type it is possible to hold a second assembly in a hovering position in relation to a first assembly and to move it in controlled manner solely by magnetic forces, in which connection the roles of first and second assemblies may also have been interchanged.

One advantage of the present disclosure consists in the fact that—contrary to Earnshaw's theorem—a stable relative position between first and second assemblies can be set, even though permanent magnets exclusively find application. The method according to the disclosure also makes it possible to execute arbitrary trajectories, in the course of which the relative rotary position between first and second assemblies may change simultaneously during the corresponding translatory motion. The method operates so stably that, despite unavoidable measurement errors in the determination of position, and errors in the computational modelling of the magnetic fields, a stable relative position between first and second assemblies can be adjusted. Over and above this, the method needs so little computing power that it can be executed with digital computers that are available nowadays at justifiable cost.

According to the disclosure, the method according to the disclosure differs from the method according to DE 102016224951.7 in that at least two position controllers, each with a single scalar controlled variable and with a single scalar correcting variable, are provided, the controlled variable being, in each instance, one of the six possible degrees of freedom as regards a relative position between the first and the second assembly, and the correcting variable representing a force or a torque that has been assigned to this degree of freedom, in which connection desired actuator positions are computed from the correcting variables and/or ascertained by means of tables of values, in which connection the actuators are set correspondingly. For the purpose of position control of the various degrees of freedom of motion, in each instance use is accordingly made of separate position controllers which operate in decoupled manner or independently of one another. The non-linear coupling of the various degrees of freedom is taken into consideration within the bounds of the stated computation.

During the operation of the movement apparatus the first and the second assembly have preferentially been arranged with such a small spacing from one another that magnetic forces can be set between the second permanent-magnet arrangement and at least some of the first permanent-magnet arrangements that are strong enough to hold the two assemblies with a spacing or in a hovering position contrary to the action of gravitational force. The second assembly is preferentially capable of being moved relative to the first assembly by adjustment of the first permanent-magnet arrangements.

The movement apparatus may comprise a single first assembly and at least one second assembly, in which case the first assembly, in particular the first base, is arranged in stationary manner in the sense of a stator, whereas the at least one second assembly, in each instance considered in itself, is mobile in relation to the first assembly, so that it can be utilized, for instance, as a workpiece-carrier or as a transport body. The movement apparatus may comprise at least one first assembly and a single second assembly, in which case the second assembly, in particular the second base, is arranged in stationary manner in the sense of a stator, whereas the at least one first assembly, in each instance considered in itself, is mobile relative to the second assembly, so that it can be utilized, for instance, as a workpiece-carrier or as a transport body. The assembly that is different from the stator, or the workpiece-carrier, is preferentially capable of being moved with a spacing from the stator or in freely hovering manner.

To be understood by the "controlled variable" is, as usual, that variable with respect to which a comparison between desired value and actual value is performed within the bounds of the closed-loop control.

The stated relative positions may comprise the local coordinates of the assembly that is different from the stator with respect to a rectangular coordinate system that is stationary with respect to the stator. The stated relative positions may comprise the relative angles of rotation assigned to the coordinate system, in particular the Euler angles (https://en.wikipedia.org/wiki/Euler_angles) of the assembly that is different from the stator. In this connection, the fact can be exploited that only comparatively slight rotary motions are preferentially executed about the X- and Y-axes which are arranged parallel to the surface of motion of the stator, whereas a complete rotation about 360° is possible only about the Z-axis which is oriented perpendicular to the surface of motion.

The assembly that is used as stator has preferentially been assembled from several separate modules which are substantially of similar design to one another, each forming a part of the base in question. Differences between the modules may arise, for instance, with regard to the assignment of a unique identifier.

A permanent-magnet arrangement preferentially comprises at least two magnetic dipoles which are each arranged in pairs with a fixed spacing and with a fixed rotary position relative to one another. In this connection it will be understood that an ideal magnetic dipole can be realized technically only approximately. In a preferred embodiment of the disclosure, it is sufficient if the formulae, retrievable under Internet address https://en.wikipedia.org/wild/Magnetic-_moment, for the forces and torques between two magnetic dipoles, or equivalent simplified approximate formulae or tables of approximate values, can be used, in particular in the computational model of the movement apparatus. The permanent-magnet arrangements have preferentially each been assembled from several separate individual magnets which each form a single magnetic dipole. By this means, a particularly good approximation to the stated formulae can be obtained in straightforward manner. The stated forces and torques are preferentially expressed with reference to the center of gravity of the assembly that is different from the stator.

The actuators preferentially each have a single degree of freedom, at most preferentially a finite degree of freedom of rotation. The actuators have preferentially been realized as electric motors, highly preferentially as brushless d.c. motors. The first permanent-magnet arrangements have preferentially been firmly connected to a drive shaft of an assigned electric motor. The drive shafts, or the rotation axes thereof, have preferentially been oriented perpendicular to a surface of motion of the first base which faces toward the second assembly. The surface of motion has preferentially been realized to be closed and/or flat. The surface of motion may have been oriented perpendicular to the direction of gravitational force, the orientation being capable of being chosen freely. The surface of motion may largely extend in space in arbitrarily curved manner.

It is conceivable that the correcting variables, or the corresponding forces and torques, are displayed to the user of the movement apparatus. By means of the correcting variables, the load can be ascertained with which the assembly that is different from the stator has been loaded. By means of the correcting variables, it can also be ascertained where on the assembly in question the load has been arranged. Furthermore, by means of the correcting variables it can be ascertained whether the moved assembly has collided with another object.

Furthermore, it is conceivable that to the user the relative position between first and second assembly.

Advantageous further developments and improvements of the disclosure are specified in the particular embodiments.

There may be provision that the position controllers have each been realized as continuous linear controllers. Appropriate controllers are known from the website that is retrievable under Internet address https://en.wikipedia.org/wiki/Control_theory. The position controllers are preferentially computed digitally. The computation preferentially take place in time-discrete manner, in particular with a constant time pulse. The position controllers have preferentially been realized as PID controllers. Other controllers—such as fuzzy controllers, for instance—can also be used. The control parameters of the proposed linear continuous controllers, however, are easier to set, this being of significance, in particular, when the control parameters are to be adjusted during the operation of the movement apparatus in order to obtain an optimal adaptation to the respective operating state.

Six position controllers may have been provided. Hence a position control in all six possible degrees of freedom of a rigid body in space is possible. A particular advantage of the method according to the disclosure consists precisely in the fact that so many closed-loop controls can be executed in parallel, without problems as regards the stability of the closed-loop control needing to be feared.

There may be provision that the actuators are adjustable by means of electric current, in which case a position controller has been assigned to each actuator, the controlled variable of said position controller being the position of the actuator in question, and the correcting variable of said position controller being, at least indirectly, the electric current in question. It is conceivable to employ a torque control that is subordinate to the position controller. To each actuator a position-determination apparatus has preferentially been assigned, with which an actual position of this actuator can be ascertained. The actual actuator position is preferentially measured directly, in which case it is likewise conceivable to compute the actual actuator position from the voltages and currents in the actuator.

There may be provision to compare the actual actuator position with the desired actuator position, and in the event of an implausible divergence to set an error marker in the digital computer, so that a diagnostic function can adopt an alternative measure and output a status message.

A position-determination apparatus may have been provided, by means of which an actual relative-position vector of the second assembly relative to the first assembly can be determined, in particular measured. The actual relative-position vector preferentially comprises six individual values corresponding to the six degrees of freedom of a rigid body in space. The position-determination apparatus has preferentially been realized in accordance with U.S. Pat. No. 6,615,155 B2.

There may be provision that the desired actuator positions are computed from the correcting variables by solving a non-linear system of equations. The movement apparatus has preferentially been designed in such a way that in each relative position between first and second assemblies at least six, preferentially at least nine, first permanent-magnet arrangements are present which are arranged in the immediate vicinity of the second permanent-magnet arrangement, so that strong magnetic forces are acting between the stated permanent-magnet arrangements. As a result, the solvability of the non-linear system of equations is ensured. The advantage of this computation lies in the fact that the time parameter is just not taken into consideration. There is therefore no need to fear that this computation will have far-reaching influence on the dynamic stability of the entire closed-loop control. The dynamic stability is primarily determined by the setting of the position controllers.

There may be provision that, within the bounds of the solving of the non-linear system of equations, a scalar error parameter is computed from the actual relative positions and predetermined desired relative positions or from the correcting-variable vector and the desired correcting-variable vector, in which case the error parameter is optimized within the bounds of the solving of the non-linear system of equations. The error parameter is preferentially computed in such a way that it is positive in every case. For instance, the sum of the squares of the differences between the six individual desired relative position and the respectively assigned actual relative position can be computed. Within the bounds of the optimization, the absolute value of the error parameter is preferentially minimized The optimization can be effected, for instance, by means of the gradient method which is known from the website that is retrievable under Internet address https://en.wikipedia.org/wild/Gradient_descent. Of course, other equivalent optimization methods are also conceivable. It is also conceivable to carry out the solving of the non-linear system of equations at least partially in advance, and to store the result in tables of values which are used during the operation of the movement apparatus. Tables of values of such a type are, however, so extensive that the solving of the non-linear system of equations in ongoing operation of the movement apparatus is preferred.

There may be provision that the optimization of the error parameter is executed iteratively, in which case the position controllers are computed in time-discrete manner with a fixed time pulse, all the iterative steps of the optimization being executed within one time pulse. By this means, a high degree of precision and a high degree of dynamics of the closed-loop control are obtained.

There may be provision that the desired actuator positions from the immediately preceding time pulse are used as starting value of the iterative optimization. The optimization therefore needs only a few iterative loops, which are readily capable of being executed within the stated time pulse.

Either several first or several second assemblies may have been provided, in which case the method according to the disclosure is executed separately for each assembly that is present in a plurality. To the extent that the first assembly is present in a plurality, this is readily possible. If the second assembly is present in a plurality, preferentially the fact is exploited that only the first permanent-magnet arrangements, which are arranged in the immediate vicinity of a second assembly, bring about an appreciable magnetic force. The various second assemblies are therefore influenced in each instance by differing first permanent-magnet arrangements, so that the various methods according to the disclosure can be executed independently of one another. The assembly that is present in a plurality has preferentially been designed in the manner of a workpiece-carrier or in the manner of a transport body.

It will be understood that the aforementioned features and those yet to be elucidated can be used not only in the respectively specified combination but also in other combinations or on their own, without departing from the scope of the present disclosure.

BRIEF DESCRIPTION OF THE DRAWINGS

The disclosure will be elucidated in more detail in the following on the basis of the appended drawings. Shown are.

DETAILED DESCRIPTION

Figure 1:
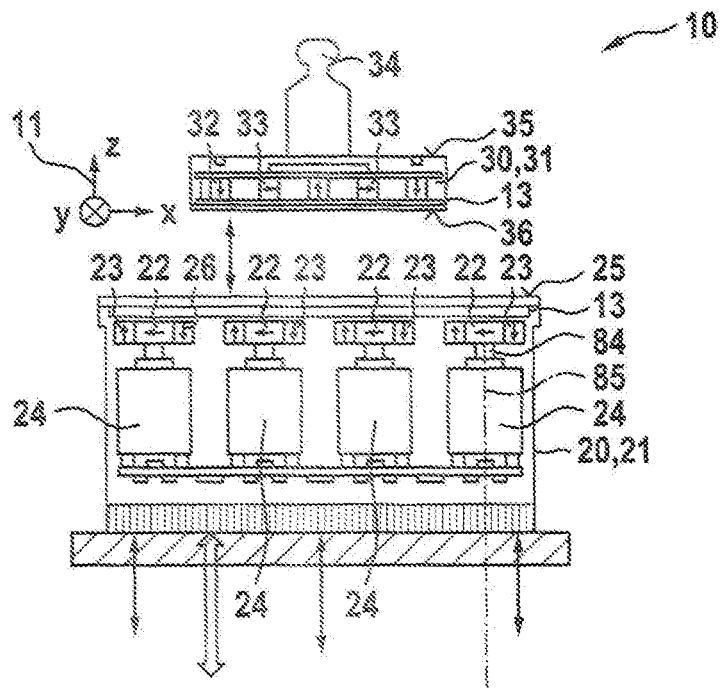
FIG. 1 a roughly schematic sectional view of a movement apparatus according to the disclosure.

FIG. 1 shows a roughly schematic sectional view of a movement apparatus 10 according to the disclosure. The movement apparatus 10 in the present case comprises a single first and a single second assembly 20;30, the first assembly having been realized in the manner of a stationary stator, and the second assembly realized in the manner of a mobile workpiece-carrier. With respect to its motion surface 25, the stator has typically been realized to be substantially larger than the workpiece-carrier. The assignment of first and second assemblies to stator and workpiece-carrier can also be chosen the other way round. The assembly that is different from the stator may be present in a plurality.

The first assembly 20 includes a base 21 which in the present case has been designed in the manner of a housing which is closed on all sides. In the present case, the upper side of the base 21 constitutes a closed, flat motion surface 25, along which the second assembly 30 is capable of being moved in freely hovering manner In the present case, the motion surface 25 has been oriented perpendicular to the direction of gravitational force, the orientation being capable of being chosen freely. In particular, the arrangement according to FIG. 1 can be operated inversely, rotated by 180°. The motion surface 25 may extend in space in largely arbitrarily curved manner.

Within the first base 21 several first permanent-magnet arrangements 22 are arranged which are each connected to the first base 21 via an assigned actuator 24. The first permanent-magnet arrangements 22 have been realized to be identical to one another and each comprise three first individual magnets which are arranged in a row alongside one another, parallel to the motion surface 25. The first individual magnets 23 each have a magnetic field that comes close to that of a magnetic dipole, at least at some distance. The corresponding dipole vectors 26 are arranged in the manner of a Halbach array, so that a particularly strong magnetic field results in the direction toward the second assembly. The spacing of a first permanent-magnet arrangement 22 from the motion surface 25 has been chosen in each instance to be the same in all the first permanent-magnet arrangements 22.

The actuators 24 in the present case take the form of electric motors, in particular brushless d.c. motors. They accordingly have a single infinite degree of rotary freedom, the corresponding rotation axis 85 being oriented perpendicular to the motion surface 25. The drive shaft 84 of the electric motor is firmly connected to the first individual magnets 23, so that the latter form a substantially rigid unit which is capable of being rotated as a whole with respect to the rotation axis 85 in question. The rotation axis is arranged in the middle of the assigned first permanent-magnet arrangement 22.

The first assembly 20 preferentially includes a plurality of first permanent-magnet arrangements 22 with assigned actuators 24 which are arranged in a planar grid, distributed over the motion surface 25. The pitches of this grid have preferentially been realized uniformly, so that only a few model parameters (no. 65 in FIG. 5) are required for the geometrical description of this arrangement.

A rectangular coordinate system 11 has been assigned to the first assembly 20, the X- and Y-axes of which coordinate system are oriented parallel to the motion surface 25, and the Z-axis of which is oriented perpendicular to the motion surface 25.

The second assembly 30 has been realized in the manner of a workpiece-carrier. Said assembly includes a second base which in the present case has been realized in the form of a flat plate of constant thickness, having a flat upper side and a flat underside 35; 36. The upper side 35 serves for receiving a payload 34, in which connection it may be shaped largely arbitrarily. The underside 36 facing toward the first assembly 20 has preferentially been adapted to the motion surface 25, in which connection it is, in particular, intended to be possible to bring the underside 36 into direct contact with the motion surface 25, so that the second assembly 30 rests stably on the first assembly 20, in particular in the currentless state of the movement apparatus 10.

In the present case, the second base 31 has a square outline in top view, in which connection rectangular, circular or any other outlines are also conceivable. The second assembly 30 includes a second permanent-magnet arrangement 32 which is arranged firmly relative to the second base. The second permanent-magnet arrangement 32 comprises several second individual magnets 33, the magnetic field of which comes close to that of a magnetic dipole, at least at some distance. A possible arrangement of the second individual magnets 33 will be elucidated in more detail with reference to FIG. 2. The second individual magnets 33 are arranged as closely as possible adjacent to the underside 36, so that strong magnetic fields can be set in the direction toward the first permanent-magnet arrangements 22.

Furthermore, the movement apparatus 10 includes a position-determination apparatus 13 which has been realized in accordance with U.S. Pat. No. 6,615,155 B2, being arranged partly in the first and partly in the second assembly 20; 30. This position-determination apparatus 13 operates inductively. Said apparatus includes planar coils in the first assembly 20, which are arranged in distributed manner over the entire motion surface 25. Furthermore, coils are provided in the second assembly 30. With this position-determination apparatus 13 it is possible, for instance, for the three local coordinates X, Y, Z of the second assembly 30 to be ascertained with respect to the coordinate system 11, in which connection, in addition, it is possible for three Euler angles (https://en.wikipedia.org/wiki/Euler_angles), for instance, to be ascertained with respect to the coordinate system 11. Within the bounds of FIGS. 3 to 6, the stated six variables are combined to form the actual relative-position vector (no. 51 in FIG. 3).

Figure 2:
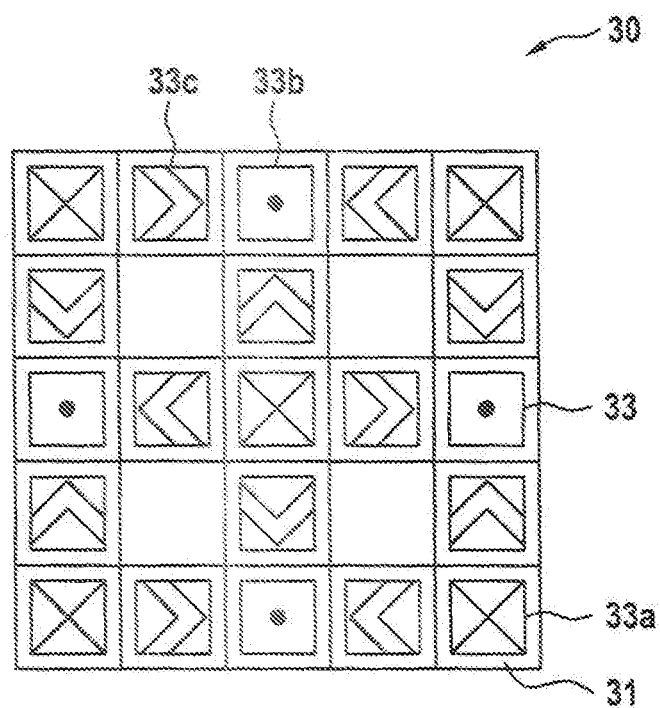
FIG. 2 a roughly schematic top view of the second assembly.

FIG. 2 shows a roughly schematic top view of the second assembly 30. The plane of the drawing is oriented parallel to the underside (no. 36 in FIG. 1) of the second assembly, the direction of view being directed toward the first assembly. The second individual magnets 33 are arranged in distributed manner, distributed over the entire underside of the second base 31. Their dipole vectors each have one of six variously possible arrangements which are oriented perpendicularly or in parallel in pairwise manner The dipole vectors of the second individual magnets 33 that have been provided with the symbol according to no. 33a are directed perpendicularly away from the underside. The dipole vectors of the second individual magnets 33 that have been provided with the symbol according to no. 33b are directed perpendicularly toward the underside. The dipole vectors of the second individual magnets 33 that have been provided with the symbol according to no. 33c are directed parallel to the underside in the direction of the arrow. The arrangement and orientation of the second individual magnets 23 have preferentially been chosen in accordance with a Halbach array in such a way that a particularly strong magnetic field results in the direction toward the first assembly.

In other respects, the precise arrangement of the second individual magnets 33 is rather of secondary importance. Of primary importance is that the arrangement and the orientation of the second individual magnets 33 relative to the second base 31 is known, being preferentially used as model parameters (no. 65 in FIG. 5) within the bounds of the method according to the disclosure.

It will be understood that, instead of second individual magnets 33, use may also be made of a one-piece permanent-magnet arrangement that has been magnetized in analogous manner This arrangement can, for instance, be produced in a 3D printing process, in which case the corresponding synthetic material constitutes a binding agent for permanently magnetic particles. But, within the bounds of series production, it is possible for a magnetic field that is reproducible with small tolerances to be produced very much more easily with individual magnets, said magnetic field being, in addition, very strong. Furthermore, with individual magnets it is possible for a magnetic field to be generated very much more easily that, within the bounds of the computational model (no. 64 in FIG. 5), can be described with good approximation by the formulae for an ideal magnetic dipole.

Figure 3:
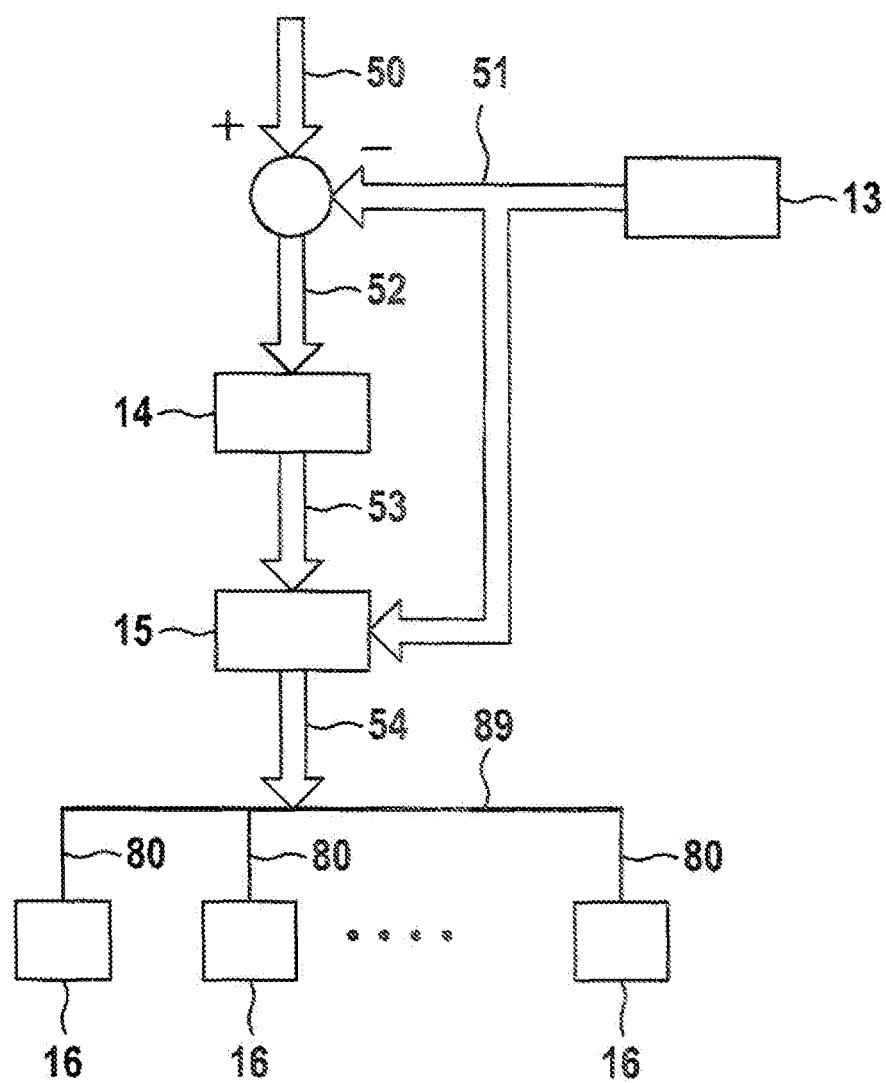
FIG. 3 a diagram of the method according to the disclosure.

FIG. 3 shows a diagram of the method according to the disclosure. The user of the movement apparatus predetermines a desired relative-position vector 50 which describes the desired position of the second assembly relative to the first assembly. In this case, the same coordinate system underlies the desired relative-position vector 50 as underlies the actual relative-position vector 51 which, as described above, is measured by the position-determination apparatus 13. The desired relative-position vector 50 may change in the course of time, preferentially continuously, so the second assembly moves along a path.

In a first step, a control-difference vector 52 is ascertained, in that the actual relative-position vector 51 is subtracted, component by component, from the desired relative-position vector 50, or conversely. The control-difference vector 52 is supplied to the position-control unit 14 which will be described in more detail with reference to FIG. 4. The position-control unit 14 ascertains a correcting-variable vector 53 from the control-difference vector 52. The correcting-variable vector 53 represents the magnetic forces and the magnetic torques that have to be exerted by the first assembly on the second assembly in order that the actual relative-position vector 51 approaches the desired relative-position vector 50.

With the computation unit 15, from the correcting-variable vector 53 a desired actuator-position vector 54 is computed which contains the positions of the various actuators that have to be set, in order that the forces and torques according to the correcting-variable vector 53 result. The computation unit 15 will be described in more detail with reference to FIG. 5. For the purpose of simplifying the computation, the desired actuator-position vector 54 preferentially describes only the actuators that are located in the vicinity of the second assembly. It will be understood that these may be differing actuators, depending on the actual relative-position vector 51.

Within the bounds of FIGS. 3 to 6, vectors that comprise several scalar individual variables are represented by a double arrow, with scalar individual variables being represented by a simple arrow. With black bar no. 89 the separation of a vector—here, the desired actuator-position vector 54—into its individual components—here, the individual desired actuator positions 80—is intended to be symbolized. The desired actuator positions 80 are supplied respectively to an assigned correcting unit 16 which respectively includes an assigned actuator. The correcting units 16 will be described in more detail with reference to FIG. 6.

The arrangement according to FIG. 3 constitutes, together with the arrangement according to FIG. 1, a closed position-control loop for the relative position between the first and the second assemblies. The control unit 14 in this case has been realized extremely simply, in which connection, in particular, simple PID controllers come into action which are not readily suited for non-linear controlled systems such as the present one. The extreme non-linearity of the controlled system is taken into consideration solely in the computation unit 15.

Figure 4:
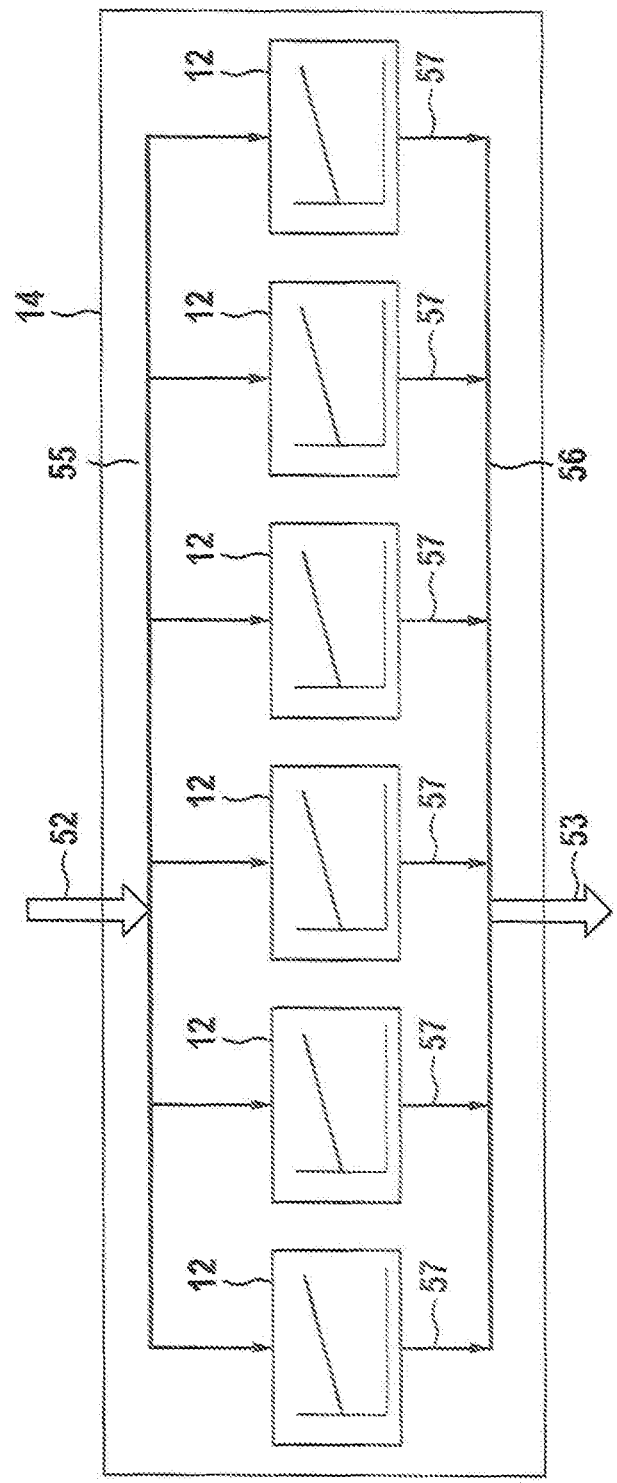
FIG. 4 a diagram of the position-control unit in FIG. 3.

FIG. 4 shows a diagram of the position-control unit 14 in FIG. 3. Horizontal black bar 55 symbolizes the separation of the control-difference vector 52 into its individual scalar control differences. The latter are supplied respectively to an assigned position controller 12 which in the present case has been realized as a continuous linear controller, in particular as a PID controller. Within the bounds of the position-control unit 14, accordingly no interaction takes place between the six degrees of freedom of the control-difference vector 52. This interaction take place solely in the computation unit 15.

Each position controller 12 ascertains a respectively assigned scalar correcting variable 57. The latter represents a force or a torque that has been assigned to the degree of freedom in question. Black horizontal bar no. 56 symbolizes that the individual correcting variables 57 are combined to form the correcting-variable vector 53.

The preferred PID controllers 12 each have three control parameters. The latter may have been set permanently. Preferentially, however, the control parameters are adjusted in operation, for instance in order to adapt the movement apparatus to a payload (no. 34 in FIG. 1) varying with time, or to an effective direction of gravitational force varying as a consequence of a varied operating position. If the surface of motion (no. 25 in FIG. 1) extends in space in curved manner, it is advantageous to adjust the control parameters in a manner depending on the relative position between first and second assemblies. Depending on whether the second assembly, or the workpiece-carrier, is to move in rather leisurely or rather dynamic manner along a predetermined path, it may likewise be advantageous to vary the stated control parameters during operation.

Figure 5:
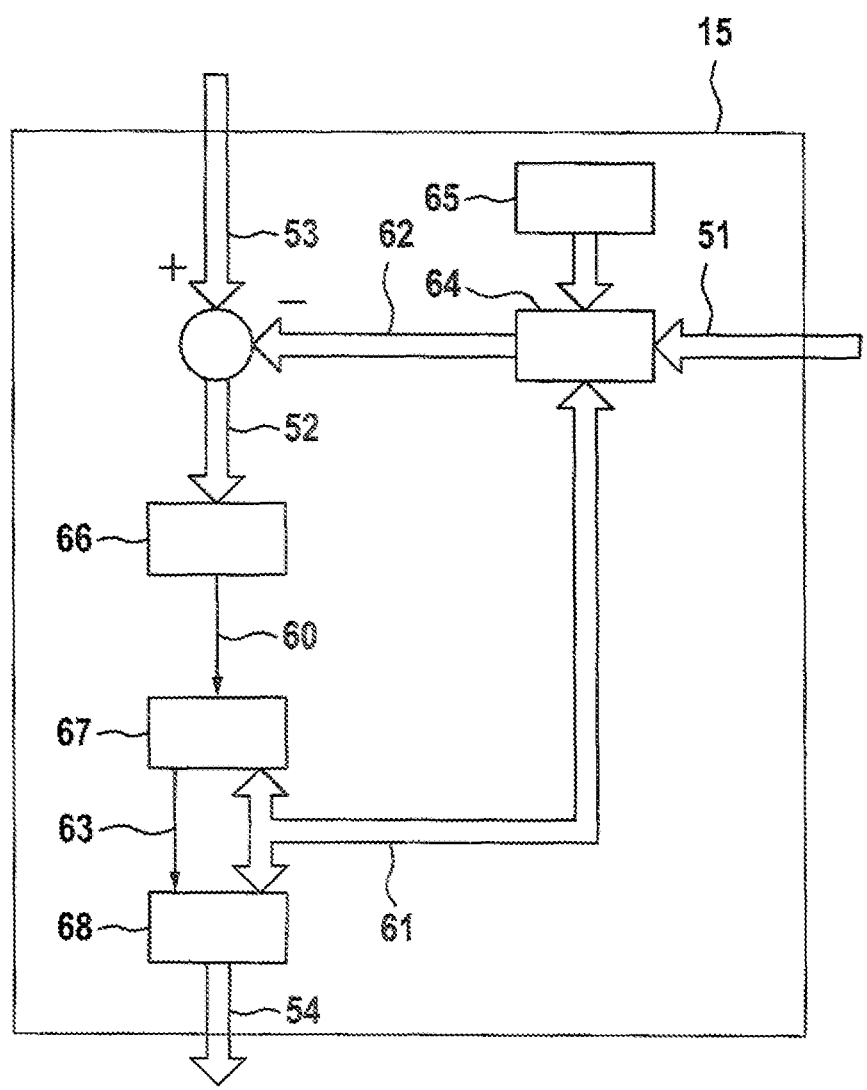
FIG. 5 a diagram of the computation unit in FIG. 3.

FIG. 5 shows a diagram of the computation unit 15 in FIG. 3. The core of the computation unit 15 is a computational model 64 of the movement apparatus with which, depending on the actual relative-position vector 51 and depending on a temporary desired actuator-position vector 61, the magnetic forces and torques that are acting between the first and second assembly are capable of being computed. The movement apparatus may have been constructed in such a way that it includes only individual magnets which each have a magnetic field that corresponds, with good approximation, to that of a magnetic dipole. Therefore the forces and the torques between two individual magnets can be computed with the formulae for an ideal magnetic dipole that are retrievable under Internet address https://en.wikipedia.org/wiki/Magnetic_moment. The total force or the total torque acting on the center of mass of the second assembly, which have been combined to form a computed correcting-variable vector 62, results from the summation over all possible pairs of a first and a second individual magnet, taking into consideration all the magnetic forces and moments, lever forces and inertial forces acting. Besides the stated input variables 51; 61, model parameters 65 that do not change during the operation of the movement apparatus are needed for this computation—in particular, the arrangement and the orientation of the second individual magnets relative to the second base, the arrangement of the actuators relative to the first base, and also the weight and the center of gravity of the second assembly. In addition, the strength, or rather the magnetic dipole moment, of the first and the second individual magnets enters into the computation.

Over and above this, model parameters can be incorporated that change during the operation of the movement apparatus—in particular, the weight and the center of gravity of the second assembly, the direction of gravitational force, or inertial forces that act in the event of an acceleration of the overall system. There may be provision to compute this information in the model from the input variables thereof, and to make it available to the position-control unit 14 for the purpose of adapting the control parameters, or to the user via a data interface, for instance in order to monitor the loading state or to implement a process control.

It will be understood that, besides the stated formulae, tables of values can also be drawn upon that, for instance, were acquired by gauging the magnetic fields of the first permanent-magnet arrangements and of the second permanent-magnet arrangement. In this case, interpolation between the individual values of the table of values can be carried out.

In other respects, FIG. 5 describes the solving of the non-linear system of equations underlying the computational model 64, in the course of which the temporary desired actuator-position vector 61 is chosen in such a way that the computed correcting-variable vector 62 is equal to the correcting-variable vector 53 of the position-control unit. In this connection, in the present case the gradient method finds application, in which connection FIG. 5 shows a corresponding iterative loop.

As starting value for the temporary desired actuator-position vector 61, the desired actuator-position vector 54 is used that was computed in the last time pulse of the position control. By means of the computational model 64, the computed correcting-variable vector 62 is ascertained therefrom. From the component-by-component difference between the correcting-variable vector 53 and the computed correcting-variable vector 62, a scalar error parameter 60 is computed by means of an error function 66. Within the bounds of the error function 66, the squares of the stated differences can, for instance, be added up.

If the error parameter 60 falls short of a predetermined limiting value a little different from zero, or reaches a predetermined number of iterations, the iterative loop is discontinued and the temporary desired actuator-position vector 61, which was stored in the intermediate memory 68, is output as desired actuator-position vector 54. This relationship is intended to be symbolized by arrow no. 63.

If the above condition has not been satisfied, a new temporary desired actuator-position vector 61 is computed from the temporarily stored temporary desired actuator-position vector 61 and from the error parameter 60 in accordance with the computational specifications of the gradient method that are retrievable from Internet address https://en.wikipedia.org/wild/Gradient_descent. In this connection, use is made, in particular, of the gradient of the computational model 64, which optionally can be computed numerically or formulaically.

Figure 6:
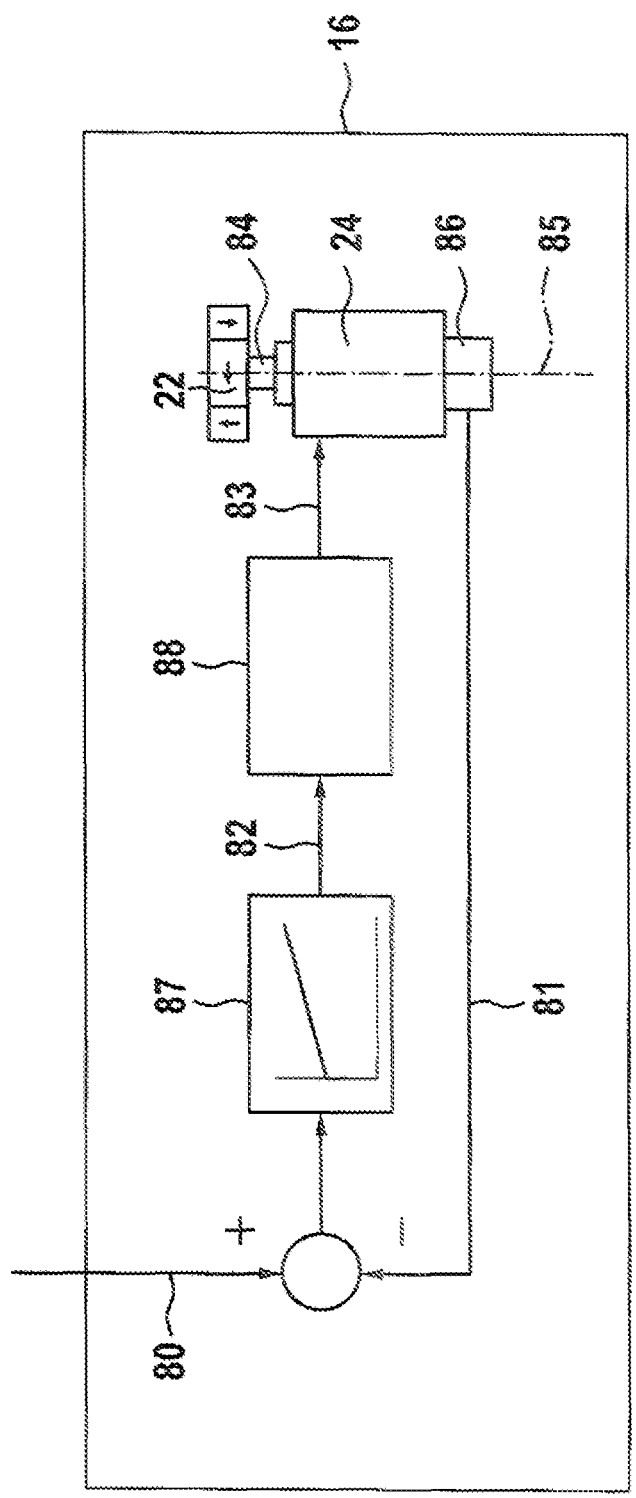
FIG. 6 a diagram of a correcting unit in FIG. 3.

FIG. 6 shows a diagram of a correcting unit 16 in FIG. 3. All the elements described hitherto with reference to FIGS. 3 to 6, with the exception of the position-determination apparatus, are preferentially computed digitally using a digital computer, the computations preferentially being carried out in time-discrete manner within a fixed time pulse. The digital computer may comprise several separate computation units which are in communication with one another for exchange of data.

In the diagram according to FIG. 6, components are predominantly contained that have been realized physically. In particular, it is a question of the actuator 24 with the first permanent-magnet arrangement 22, which was already elucidated with reference to FIG. 1.

Said actuator is equipped with a position-determination apparatus 86 in the form of a rotary encoder which communicates an actual actuator position 81 to the digital computer. Furthermore, a current controller 88, which is also designated as a drive amplifier, has been assigned to the actuator 24. Said current controller supplies to the actuator 24 the electric current 83 that is necessary in order to set the desired actuator torque 82 predetermined by the digital computer.

The position controller 87 is preferentially computed digitally by the digital computer. It is preferentially a question of a continuous linear controller, in particular a PID controller. The difference of the desired actuator position 80 in question and the actual actuator position 81 in question is supplied to the position controller 87. From this, the desired actuator torque 82 already mentioned is ascertained. As a result, a closed control loop is present which causes the actual actuator position 81 to approximate to the desired actuator position 80.

REFERENCE SYMBOLS

10 movement apparatus
11 coordinate system
12 position controller
13 position-determination apparatus
14 position-control unit
15 computation unit
16 correcting unit
20 first assembly
21 first base
22 first permanent-magnet arrangement
23 first individual magnet
24 actuator
25 motion surface
26 dipole vector
30 second assembly
31 second base
32 second permanent-magnet arrangement
33 second individual magnet
33a second individual magnet with dipole vector perpendicular from the underside
33b second individual magnet with dipole vector toward the underside
33b second individual magnet with dipole vector parallel to the underside in the arrow direction
34 payload
35 upper side
36 underside
50 desired relative-position vector
51 actual relative-position vector
52 control-difference vector
53 correcting-variable vector
54 desired actuator-position vector
55 separation of the control-difference vector into the individual control differences
56 combination of the individual correcting variables to form the correcting-variable vector
57 scalar correcting variable
60 scalar error parameter
61 temporary desired actuator-position vector
62 computed correcting-variable vector
63 trigger which is triggered if the error parameter is small enough or a predetermined number of iterative steps were executed
64 computational model of the movement apparatus
65 model parameters
66 error function
67 optimization method
68 intermediate memory
80 desired actuator position
81 actual actuator position
82 desired actuator torque
83 electric current
84 drive shaft
85 rotation axis of the drive shaft
86 position-determination apparatus
87 position controller
88 current controller
89 separation of the desired actuator-position vector into the individual desired actuator positions

What is claimed is:

1. A method for operating a movement apparatus having a first assembly and a second assembly, the first assembly including a first base and several first permanent-magnet arrangements, the first permanent-magnet arrangements being connected to the first base via respectively assigned actuators such that they are each configured to move as a whole relative to the first base in at least one degree of freedom by the respectively assigned actuator, the second assembly including a second base and a second permanent-magnet arrangement, the second permanent-magnet arrangement being arranged firmly relative to the second base, the method comprising:

providing at least two position controllers, each with a single scalar controlled variable and with a single scalar correcting variable, the single scalar controlled variable being, in each instance, one of six possible degrees of freedom with regard to a relative position between the first assembly and the second assembly, the single scalar correcting variable representing one of (i) a force and (ii) a torque that has been assigned to the one of six possible degrees of freedom, computing desired positions of the actuators at least one of (i) from the single scalar correcting variables and (ii) using tables of values; and setting the actuators to the desired positions.

2. The method according to claim 1, wherein the at least two position controllers are continuous linear controllers.

3. The method according to claim 1, wherein the at least two position controllers comprise six position controllers.

4. The method according to claim 1, wherein:

each actuator is configured to be adjusted by a respective electric current;

wherein a respective position controller of the at least two position controllers is assigned to each actuator, the single scalar controlled variable of the respective position controller is a position of the respectively assigned actuator, the single scalar correcting variable of the respective position controller is, at least indirectly, the respective electric current.

5. The method according to claim 1 further comprising:

providing a position-determination apparatus; and determining, with the position-determination apparatus, a vector of actual relative positions between the first assembly and the second assembly.

6. The method according to claim 5, the determining the vector of actual relative positions further comprising:

measuring, with the position-determination apparatus, the vector of actual relative positions between the first assembly and the second assembly.

7. The method according to claim 1, the computing the desired positions of the actuators further comprising:

computing the desired positions of the actuators from the single scalar correcting variables by solving a non-linear system of equations.

8. The method according to claim 7 further comprising:

computing, within bounds of the solving of the non-linear system of equations, a scalar error parameter one of (i) from actual relative positions between the first assembly and the second assembly and predetermined desired relative positions between the first assembly and the second assembly and (ii) from a vector of the single scalar correcting variables and a vector of desired correcting variables, optimizing the scalar error parameter within the bounds of the solving of the non-linear system of equations.

9. The method according to claim 8, wherein:
the optimizing the scalar error parameter is executed iteratively;
the at least two position controllers operate in a time-discrete manner with a fixed time pulse; and
all iterative steps of the optimizing the scalar error parameter are executed within one time pulse of the at least two position controllers.

10. The method according to claim 9, wherein a vector of the desired positions of the actuators from an immediately preceding time pulse of the at least two position controllers is used as starting value of the optimizing the scalar error parameter.

11. The method according to claim 1, wherein:
one of (i) the first assembly comprises a plurality of first assemblies and (ii) the second assembly comprises a plurality of second assemblies; and
the method is executed separately one of (i) for each first assembly in the plurality of first assemblies and (ii) for each second assembly in the plurality of second assemblies.

12. A movement apparatus comprising:
a first assembly including a first base and several first permanent-magnet arrangements, the first permanent-magnet arrangements being connected to the first base via respectively assigned actuators such that they are each configured to move as a whole relative to the first base in at least one degree of freedom by the respectively assigned actuator; and
a second assembly including a second base and a second permanent-magnet arrangement, the second permanent-magnet arrangement being arranged firmly relative to the second base,
wherein at least two position controllers are provided, each with a single scalar controlled variable and with a single scalar correcting variable, the single scalar controlled variable being, in each instance, one of six possible degrees of freedom with regard to a relative position between the first assembly and the second assembly, the single scalar correcting variable representing one of (i) a force and (ii) a torque that has been assigned to the one of six possible degrees of freedom,
wherein desired positions of the actuators are computed from the single scalar correcting variables,
wherein the actuators are set to the desired positions.

13. A movement apparatus according to claim 12 further comprising:
the at least two position controllers.

\* \* \* \* \*